(12) United States Patent
Hogg (10) Patent No.: US 8,196,243 B2
(45) Date of Patent: Jun. 12, 2012

(54) FUNCTIONAL FITTING OF CYCLISTS IN CLIPLESS PEDAL SYSTEMS

(75) Inventor: Stephen J. Hogg, Maroubra (AU)

(73) Assignee: Pedal Pushers Cycles Pty Ltd, Roebery (AU)

( * ) Notice: Subject to any disclaimer, the term of this patent is extended or adjusted under 35 U.S.C. 154(b) by 464 days.

(21) Appl. No.: 12/511,448

(22) Filed: Jul. 29, 2009

(65) Prior Publication Data

US 2011/0023244 A1    Feb. 3, 2011

(51) Int. Cl.
*A43B 5/14*    (2006.01)
(52) U.S. Cl. .......................................... 12/142 P; 36/131
(58) Field of Classification Search ............... 12/142 R, 12/142 P; 36/142–144, 131
See application file for complete search history.

(56) References Cited

U.S. PATENT DOCUMENTS

| | | | |
|---|---|---|---|
| 4,377,952 A * | 3/1983 | Gamondes | 74/594.6 |
| 4,449,308 A * | 5/1984 | Schar | 36/131 |
| 5,142,938 A * | 9/1992 | Sampson | 74/594.6 |
| 5,199,324 A * | 4/1993 | Sain | 74/594.4 |
| 5,860,330 A * | 1/1999 | Code et al. | 74/594.6 |
| 5,946,754 A | 9/1999 | Baldini | |
| 6,477,793 B1 * | 11/2002 | Pruitt et al. | 36/131 |
| 7,104,159 B2 * | 9/2006 | Plassiard et al. | 74/594.6 |
| 2001/0027616 A1 * | 10/2001 | Silvestrini et al. | 36/144 |
| 2007/0255191 A1 * | 11/2007 | Cozzo et al. | 602/23 |

FOREIGN PATENT DOCUMENTS

| | | |
|---|---|---|
| EP | 1502515 | 7/2003 |
| EP | 2182823 | 3/2009 |
| WO | WO2009027338 | 3/2009 |

OTHER PUBLICATIONS

New Zealand Examination Report dated Aug. 3, 2010.
"Welcome To Bikefit.com", http://bikefitpro.blogspot.com.au/2009_02_01_archive.html, Feb. 2009, 10 pages.
"Featured Bike Fitter", http://www.bikefit.com/fitterbruceguild.php, Aug. 2, 2012, 3 pages.
"Cleat Wedge—Installation Instructions", http://www.bikefit.com/docs/WedgeInstallationInstructions.pdf, 1 page.

\* cited by examiner

*Primary Examiner* — Marie Patterson
(74) *Attorney, Agent, or Firm* — Boyle Fredrickson, S.C.

(57) ABSTRACT

A method of fitting a cyclist in a cycling shoe is provided. The cycling shoe is engagable in a clipless pedal via a cleat affixed to the cycling shoe. The method includes the steps of compensating for a cyclist's biomechanical malalignments within the kinetic chain involved in cycling by providing a tilt to the cyclist's forefoot and challenging the cyclist with a neuromuscular feedback test as the cyclist uses their foot to apply a force through the cycling shoe to the clipless pedal. The compensation is varied and the cyclist is retested until a favorable response to the neuromuscular feedback test indicates a functional compensation.

10 Claims, 6 Drawing Sheets

FUNCTIONAL FITTING OF CYCLISTS IN CLIPLESS PEDAL SYSTEMS

FIELD OF THE INVENTION

The present invention relates generally to fitting a cyclist in a clipless pedal system and, more particularly, to techniques that can be used to adjust the fit of a cycling shoe in a clipless pedal.

BACKGROUND OF THE INVENTION

Bicycles have, during their history, used pedals of various types and configurations. A clipless pedal system is now widely used amongst cycling enthusiasts and professional cyclists alike. A clipless pedal system is one that uses a combination of a pedal and a matching cleat attached to a cycling shoe. That is, the cyclist's shoe has a cleat that engages in use with a matching pedal fitting.

Clipless pedals are widely used and provide various advantages to the cyclist. Popular systems of clipless pedals are manufactured by Shimano, Look Cycle International, Time Sport, Campagnologo S.r.l., Speedplay Inc. and others. Regardless of manufacturer, the various clipless pedal systems typically operate in a similar manner: a cyclist engages their cycling shoe with the clipless pedal by stepping their cycling shoe down upon the clipless pedal, such that the cleat on the cycling shoe releasably engages with the clipless pedal. To disengage, the cyclist typically rotates their heel outwardly to remove their shoe from the clipless pedal. Some systems operate so that release may also be accomplished by inward rotation of the heel.

Clipless pedals have proven very popular, as they are of advantage to most cyclists when compared to systems that use toe clips and straps, or simple platform-type pedals. The primary advantages are that the cyclist's shoe and foot are firmly secured to the pedal, and power can be smoothly applied to the crank throughout the cycle. Also, the cyclist's foot can be readily removed from the pedals when need be with a simple foot action. While very popular and providing various advantages, clipless pedal systems do not provide a universal solution for all cyclists.

OBJECT OF THE INVENTION

An object of the present invention is to provide a useful alternative to existing approaches to fitting cyclists in clipless pedals that allow for improved performance or reduced risk of injury.

SUMMARY OF THE INVENTION

The inventive insight resides in a recognition that one can advantageously address deficiencies of a cyclist's fit in a clipless pedal system by compensating for kinetic chain malalignments that affect cycling. A way of achieving this is to compensate biomechanical malalignments within the kinetic chain at the cyclist's foot, and then to challenge the cyclist with a neuromuscular feedback test that indicates whether or not the compensation is functional to neuromuscular efficiency. The implication is that cycling performance improves and the chance of overuse injury decreases as neuromuscular efficiency improves.

The limitations of a cyclist's biomechanical alignment can be compensated for in a variety of ways. Compensating for malalignment between a cyclist's forefoot and rearfoot (that is, across the foot, relative to the transverse plane) is found to be a way of improving neuromuscular efficiency of a cyclist's kinetic chain. Conveniently, compensation is made by using wedges, which can be applied inside the cycling shoe, or between the cleat and the sole of a cycling shoe. Desirably, pre-fabricated wedges are used, which each provide a predetermined amount of compensation to the kinetic chain of the cyclist. Conveniently, such wedges are reversible; that is, shaped so that they can be reversed in orientation to compensate alternatively for inversion or eversion depending upon the orientation of the wedge. This means that identical wedges can be used in suitable combinations and orientations to meet the needs of cyclists. The compensation required at the right and left feet is by no means the same and is in fact quite commonly found to be different.

While a cyclist may suffer various malalignments within the kinetic chain that are detrimental to their cycling performance, compensation can conveniently be made at each of the cyclist's feet. The compensation provided at the cyclist's feet compensates the biomechanical malalignment of the feet, but also affects the biomechanical orientation of successive parts of the kinetic chain, namely of foot to ankle, ankle to lower leg, lower leg to knee, knee to upper leg, and upper leg to hip and pelvis. The cyclist is successively challenged to a series of neuromuscular feedback tests until they are confirmed as responding favourably or "testing strong", which indicates that the relative alignment of the kinetic chain after compensation is functional to cycling.

The wedges may be cleat wedges that are fitted between a cleat and the sole of a cycling shoe to increase or decrease foot inversion or eversion depending on the orientation of the wedge, or in-shoe wedges that are fitted inside the toe box of a cycling shoe to increase or decrease foot inversion or eversion depending on the orientation of the wedge. Other forms of compensation are possible.

There are various neuromuscular feedback tests that can be used. A convenient test is to simply have the cyclist push down upon a clipless pedal after compensation, and place their arm stretching horizontally outwardly from their body while a tester pushes down upon the outstretched arm. If an external force supplied by the tester can be readily resisted, the cyclist has favourably responded to the neuromuscular feedback test. Otherwise, if the tester can readily push the cyclist's arm downwardly while applying relatively little force, the cyclist has responded unfavourably to the test. It is typically quite apparent when the cyclist is able to resist the tester.

The cyclist prepares for the neuromuscular test by applying pressure to the clipless pedal through the cycling shoe (while, of course, being "clipped in"), thus providing a stimulus to the cyclist. The cyclist can be sitting on the bike, or a stationary bike, or simply sitting on a stool with their foot engaged in a similar clipless pedal affixed to a specially constructed testing frame intended for testing purposes. This latter arrangement is preferred for convenience during testing, but is reconfirmed by retesting on a bike while pedalling under load.

Occasionally, the amount of compensation needs to be altered from that to which the cyclist responds favourably in static testing. When this happens, it is because of functional changes in the cyclist that can occur under dynamic load that may not be present in a static testing environment with load applied to the pedal.

The invention in summary provides, amongst other advantages, a useful test of the functional integrity of the cyclist's kinetic chain for various levels of compensation, and an indication of an improved functional fit in the clipless pedal. While the invention is primarily intended to address limitations in road, triathlon and track cycling, the invention is also applicable to any clipless pedal system used for cycling, such as those use for mountain bikes and commuter cycles.

DETAILED DESCRIPTION

Figure 1:
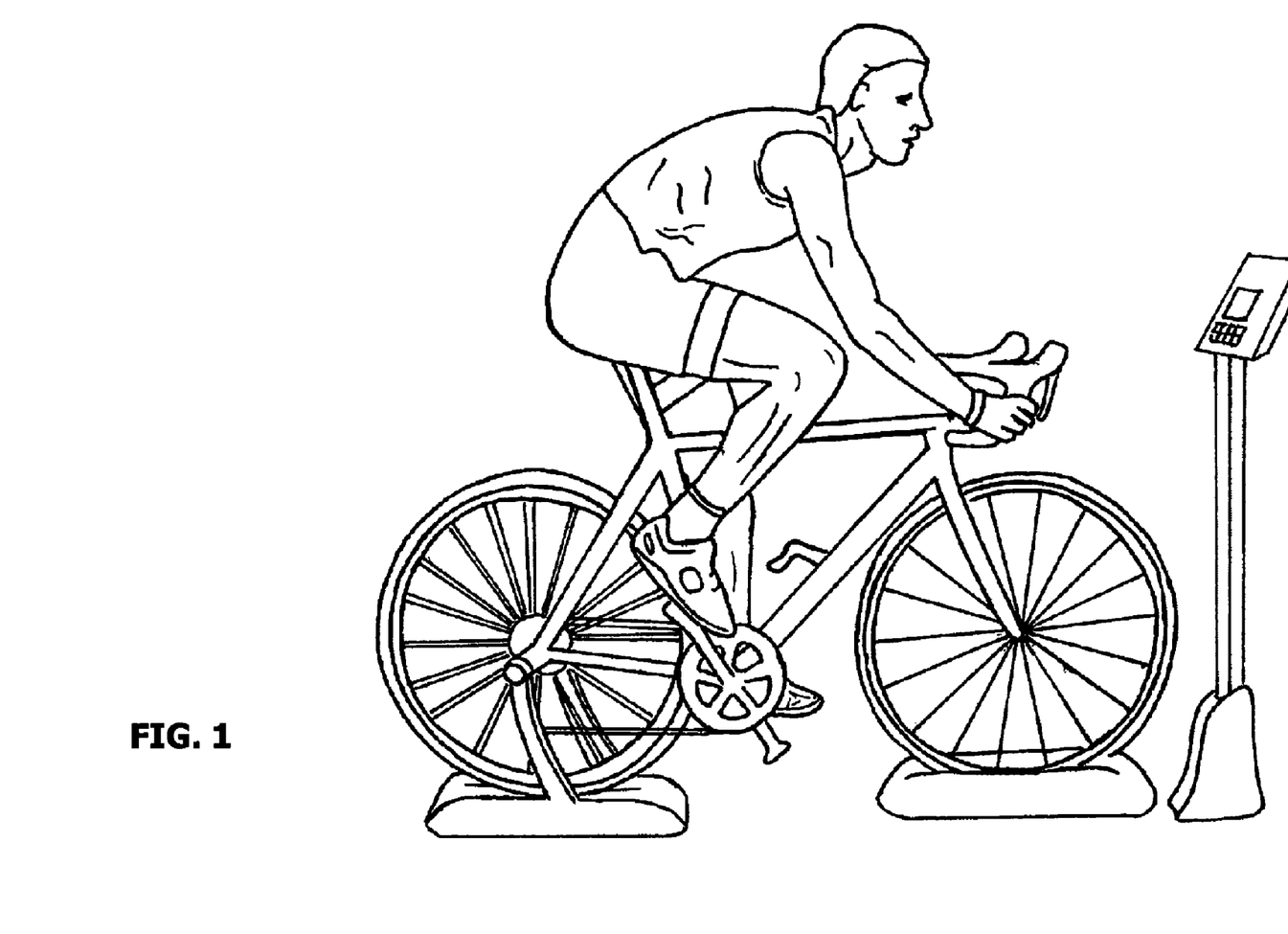
FIG. 1 is an illustration of a cyclist in profile.

FIG. 1 illustrates a cyclist in profile, which shows the kinetic chain involved in while cycling—these are the various body parts that are involved in the pedalling action. Moving from the pedal to the cyclist's core, the body parts involved in the pedalling action are the cyclist's foot, ankle, lower leg, knee, upper leg, hip and pelvis, lower back and deep abdominal muscles. These interlinked body parts during movement form a kinetic chain in the lower half of the body that is responsible for co-ordinating and transferring power to the pedal during cycling when seated. Biomechanical malalignments of the kinetic chain inevitably compromise performance and increase the risk of overuse injury. Functional integrity of the kinetic chain involved in cycling is the foundation of cycling performance. Consequently, functional compensation of biomechanical malalignments in the kinetic chain is key to improving performance and reducing the risk of overuse injury.

Biomechanical malalignments originating at the feet are particularly important for cyclists. The feet are where the cyclist ultimately transmits power to the pedals, and malalignment at the lower extremity of the kinetic chain has implications further up the cyclist's kinetic chain. The cyclist's feet thus represent a first and important link in the kinetic chain. While the biomechanical operation of feet is complicated, it is found that there is commonly a malalignment between the forefoot and the rearfoot that creates functional limitations for cycling. Such malalignments may be caused by any of a number of factors, such as genetic predisposition, developmental issues, injury, muscular weakness, chronic trauma, and so on.

Issues of malalignment of the component parts of the foot have biomechanical implications for the cyclist as they engage in a dynamic pedalling motion. Other malalignments can also come into play. Seated on the saddle, and clipped into pedals spinning around a fixed crank, the cyclist's body compensates for malalignments at the feet and elsewhere in the kinetic chain involved in cycling. The cyclist's own compensatory movement patterns are of course dysfunctional to varying degrees, as they reduce performance and expose the cyclist to overuse injuries. The human body is a complex system of interactions and the techniques described herein allows the determination of the amount and orientation of compensation needed at the feet to restore functional integrity to the kinetic chain involved in pedalling, regardless of where the malalignment or malalignments reside.

A clipless pedal system maintains the heel in an open chain, and the heel follows compensation applied to the forefoot. There are consequent compensations made up the kinetic chain. For example, an uncorrected malalignment of the foot can cause a variety of compensatory mechanisms to evolve. A common compensatory mechanism is an oscillating movement of the knee so that it moves towards the centreline on the pedal down stroke and away from the centreline on the pedal upstroke. Each individual has their own compensatory movement patterns depending on their own malalignments and other factors, and there is a significant amount of variation between individual patterns. After functional compensation, the knee typically tracks far less widely in side-to-side movement and is instead positioned in a more neutral position in relative biomechanical alignment with the upper leg and lower leg.

Further, if there are other elements of the kinetic chain involved in the pedalling action that are misaligned, then the correct amount and orientation of forefoot wedging, whether inside the shoe or outside the shoe (that is, between the sole of the shoe and the cleat) as described herein will have a positive effect in restoring functional biomechanical integrity.

On occasion, this can mean that the amount and orientation of forefoot wedging that restores functional integrity to the kinetic chain may not correlate with the degree and direction of forefoot tilt.

The possibility of varus or valgus forefoot tilt implies that there is an ideal or neutral foot plant angle for the cyclist that maintains joint integrity and stability within the kinetic chain involved in the pedalling action. This functional level of compensation is achieved via an appropriate amount of forefoot wedging, confirmed by a neuromuscular feedback test. The forefoot wedging provides a tilt inclining from a horizontal orientation along a transverse axis across the width of the foot. This form of wedging, which may provide from near zero to as much as 20° of tilt or more is intended to provide functional compensation along the cyclist's kinetic chain.

The proprioceptive capabilities of a cyclist's body are so sensitive that a 1 mm change in foot inversion or eversion can alter the integrity of the cyclist's kinetic chain during the pedalling motion. Proprioception is essentially the brain's awareness of the body in space, and is driven by sensory receptors located in the muscles, tendons, and joints, also known as proprioceptors, which convey information about the physical state and position of skeletal muscles and joints to the central nervous system. Proprioceptors provide information to the central nervous system that is essential for smooth, coordinated movements and the maintenance of body posture and injury prevention. Neuromuscular efficiency is the ability of the nervous system to effectively interact with the muscular system, and is based upon sound proprioception.

Figure 2:
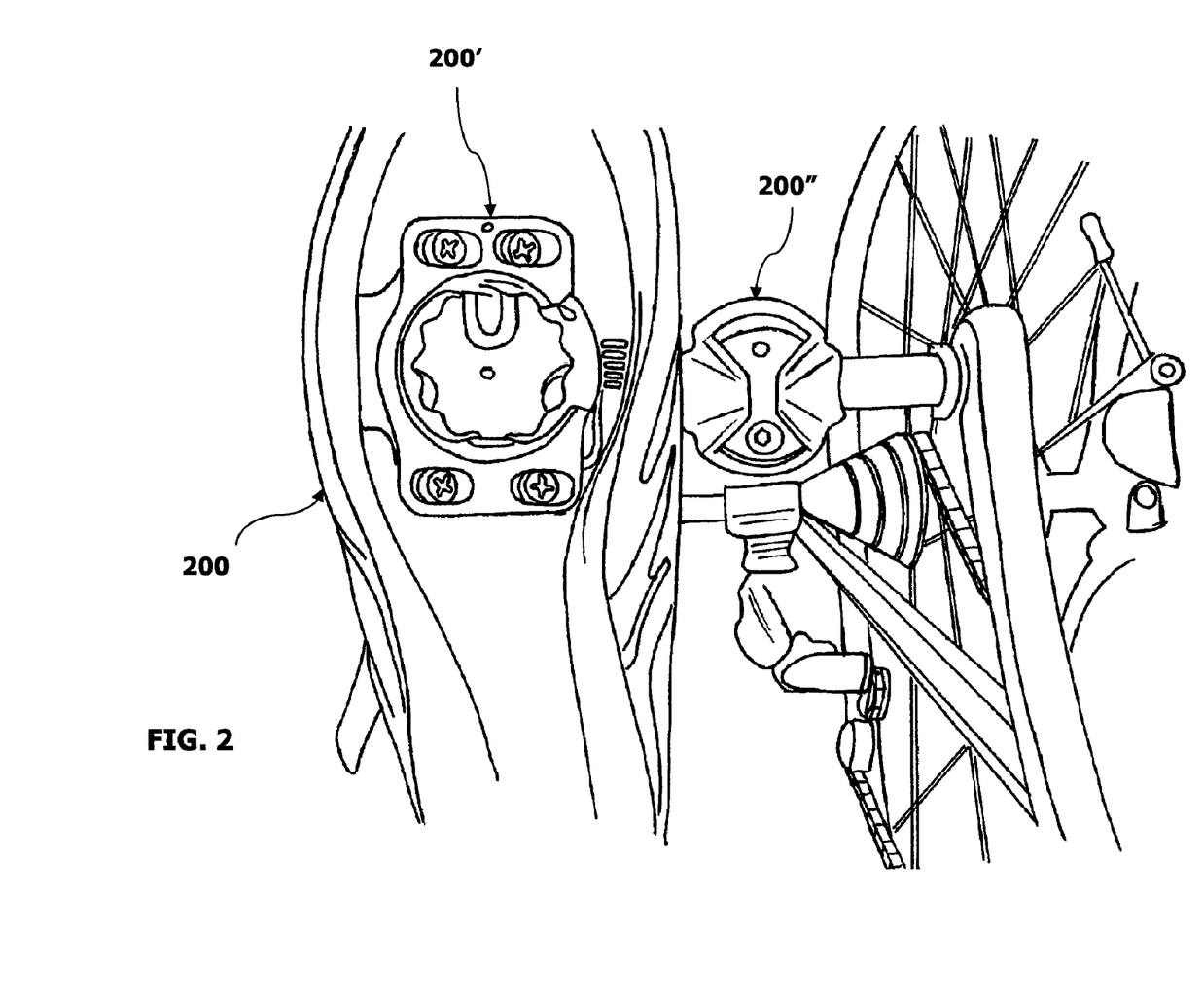
FIG. 2 is an illustration of a cycling shoe and a matching clipless pedal and cleat.

FIG. 2 illustrates a cycling shoe 200 and a clipless pedal 200". The shoe 200 has a cleat 200' that is attached to the sole of the shoe 200. Many manufacturers supply cycling shoes 200, which may, for example, be manufactured of a synthetic leather-like material for a close but accommodating fit, and have a light and stiff sole manufactured of carbon fibre material. The pedal 200" and matching cleat 200' are manufactured and sold as an integrated system by several manufacturers. Illustrated is a pedal 200" and cleat 200' manufactured by Speedplay Inc. of California, United States of America.

Figure 3:
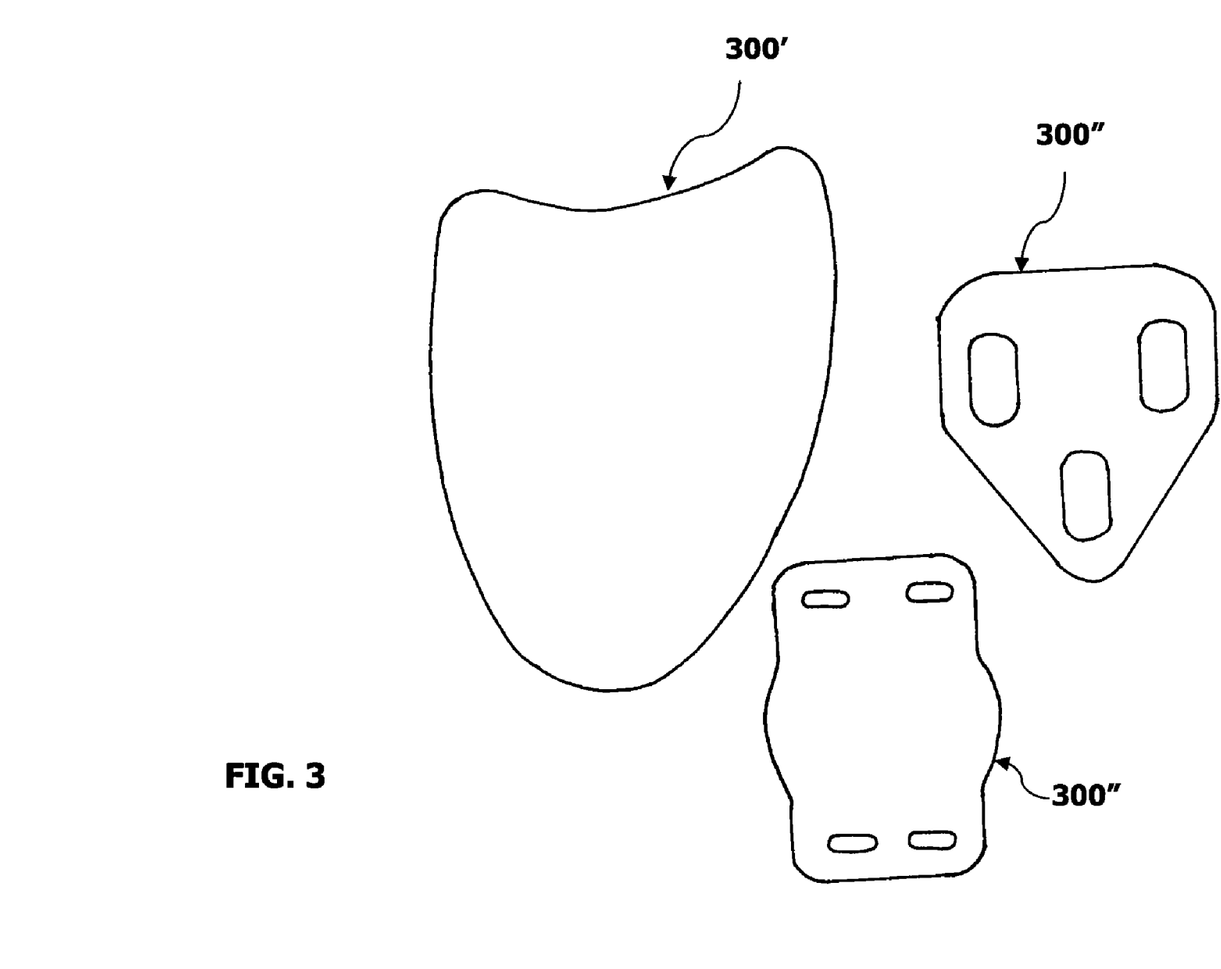
FIG. 3 is an illustration of an in-shoe wedge and several cleat wedges.

FIG. 3 illustrates some of the types of forefoot wedges 300, both inshoe 300' wedges and cleat wedges 300" that are available to compensate a cyclist as described herein. Wedges 300 are, as in the name implies, are shaped to have a relatively thin and flat surface, but profiled to be thicker on one side than the other. The difference in thickness at each side is minimal, with the gradient across the wedge as shallow as, say 0.5°, up to say, 2°, thus allowing for relatively fine adjustments in compensation. Wedges of any suitable manufacture can be used.

As described, forefoot tilt relative to the rearfoot is a common biomechanical misalignment and compensation using wedges provides for correction of foot plant angle at the pedal. The thicker side of the wedge 300 is placed at the inside or medial side of the foot to compensate for varus forefoot tilt, or inversion. Conversely, the thicker side of the wedge 300 is placed at the outside or lateral side of the foot to compensate for a valgus forefoot tilt relative to the rearfoot. A varus forefoot tilt or inversion relative to the rearfoot is more common than a valgus forefoot tilt or eversion relative to the rearfoot. A forefoot wedge 300 indirectly corrects the rearfoot, as during the cycling motion, the cyclist's heel is not fixed, for example, to the ground.

The amount of static varus or valgus forefoot tilt suggests a starting estimate for the amount of compensation that may be functional for cycling. As a general proposition, the greater the amount of forefoot tilt, the greater the compensation required for functional improvement. However, the dynamic performance of a cyclist cannot be accurately predicted from measures of static positioning. Nevertheless, a starting estimate for the amount of compensation can be inferred from static measurements. This is not essential, as one can instead work from zero or minimal compensation to increasing levels of compensation to find a functional level of compensation.

An in-shoe wedge 300' and a cleat wedge 300" are illustrated, and can both be used to provide suitable compensation of a cyclist's foot. These wedges 300 can be used as alternatives, or in combination if need be. These wedges 300 provide a discrete amount of compensation to the cyclist's foot. The wedges 300 may be shaped to provide a differential of as little as 1 mm thickness from one side edge of the wedge 300 to the other. In-shoe wedges 300' have a characteristic shape for fitting a broad spectrum of cycling shoes 200.

As illustrated, cleat wedges 300" are manufactured in different configurations for compatibility with different clipless pedal systems. Road shoes and clipless pedals for them typically use three well-spaced bolts in a triangular pattern to fix the cleat to the road shoe. This provides a secure and reliable system and lends itself to the use of the illustrated three-hole cleat wedges 300". The 4-hole cleat wedge 300" illustrated is specifically suitable for use with the cleats 200' of Speedplay Inc.

Suitable wedges 300 are produced by Paul Swift of Bike Fit Systems, LLC of Washington, and are described and illustrated in further detail in U.S. Pat. No. 5,860,330, the content of which is hereby incorporated by reference. An in-shoe wedge 300' (as supplied by Bike Fit Systems LLC) provides 1.5° of tilt, and is reversible, meaning that the wedge 300' can be simply turned over and refitted in the cycling shoe 200. The cleat wedge 300" (as supplied by Bike Fit Systems LLC) provides a similar amount of compensation and is also reversible.

The advantage of using relatively thin, reversible wedges 300 is that a required number of such identical wedges 300 can be used in combination to provide the desired amount of compensation to each of the cyclist's feet. This allows various combinations of identical pre-fabricated wedges 300 to be tested so that the needs of most cyclists can be readily met.

A number of wedges 300 is intended to be used together to provide a greater degree of compensation to the cyclist. A cyclist may be found to benefit from one to as many as, say, fifteen wedges to provide functional compensation. There is no particular limit to the amount of compensation that may be required. The number of wedges and amount of compensation required at each foot can vary, and need not be the same on both feet.

In-shoe wedges 300' are fitted inside a cycling shoe 200, typically underneath the inner sole or any shaped insert that may be fitted inside the cycling shoe 200. The number of in-shoe wedges 300' that can be used is determined by how close the cycling shoes 200 already fit the cyclist. A tight or snug-fitting cycling shoe 200 can only accommodate a limited number of in-shoe wedges, whereas a more relaxed fitting cycling shoe 200 will be able to accommodate a greater number of wedges. For this reason, cleat wedges 300" may be preferred over in-shoe wedges 300'.

In-shoe wedges 300' are preferred to determine the optimum amount of correction for convenience; it is quicker to add in-shoe wedges 300' one at a time than it is to remove and reattach cleat 200' multiple times while inserting a cleat wedge 300" each time prior to testing.

In-shoe wedges 300' are preferred, however, for use in conjunction with mountain bike shoes. Mountain bike shoes typically have tread blocks on the sole, as they are designed for some walking as well as riding. Furthermore, mountain bike shoes have cleats that are relatively small, fixed by two bolts mounted side-by-side and recessed into a gap between the tread blocks on the soles of the shoes. The implication is that using a cleat wedge 300" is not a particularly practical or convenient solution for mountain bike shoes if more than a small number are required. Sometimes, due to lack of vertical space inside the toebox of a mountain bike shoe, a combination of in-shoe wedges 300' and cleat wedges 300" adapted for mountain bike shoes may be used.

Figure 4:
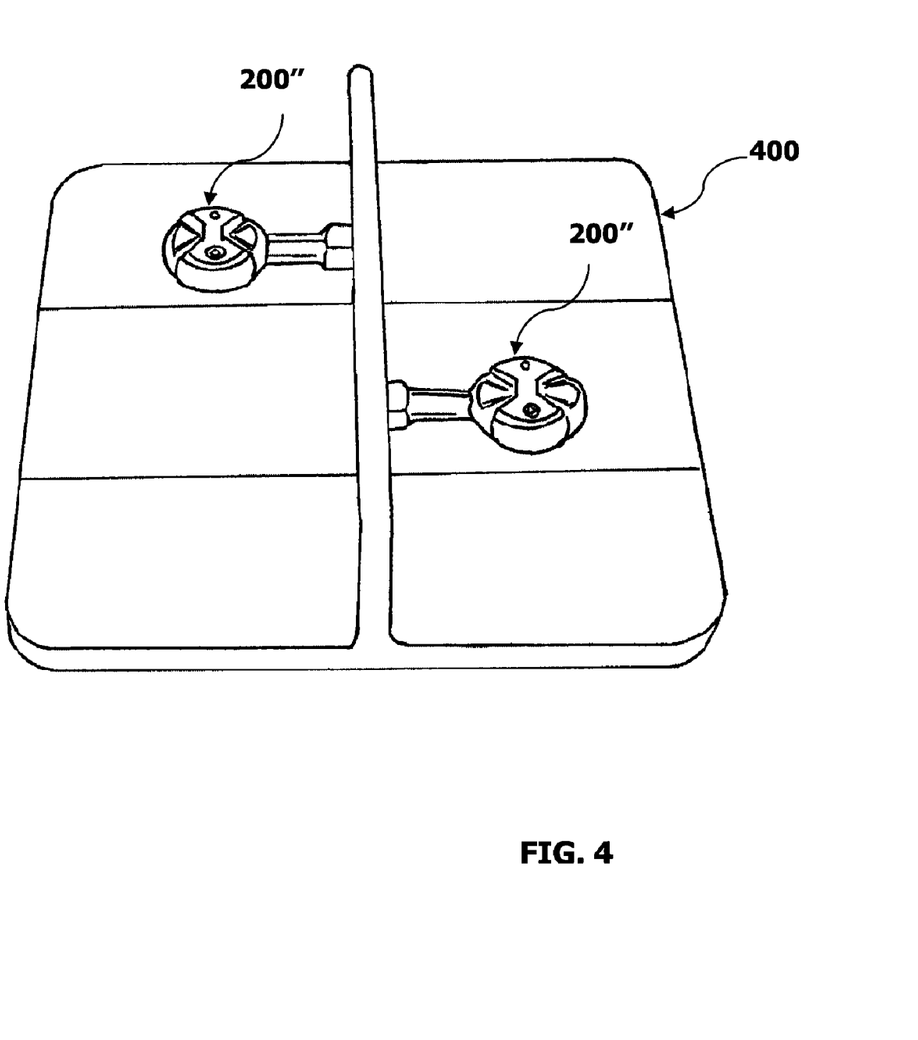
FIG. 4 is an illustration of a mounting frame having clipless pedals fitted.

FIG. 4 illustrates a testing frame 400 having clipless pedals 200" attached to the frame 400. This frame 400 is used for convenience when challenging a cyclist to a neuromuscular feedback test. The cyclist, wearing the cycling shoe 200 adjusted with compensating wedges 300', 300", clips into the pedal 200" attached to the frame 400. The cyclist is instructed to push down upon the pedal 200". This provides a stimulus to the cyclist. The testing frame 400 is used as a matter of convenience to avoid having the cyclist having to climb on and off the bicycle each time the cyclist is presented with a neuromuscular feedback test, as described herein.

Figure 5:
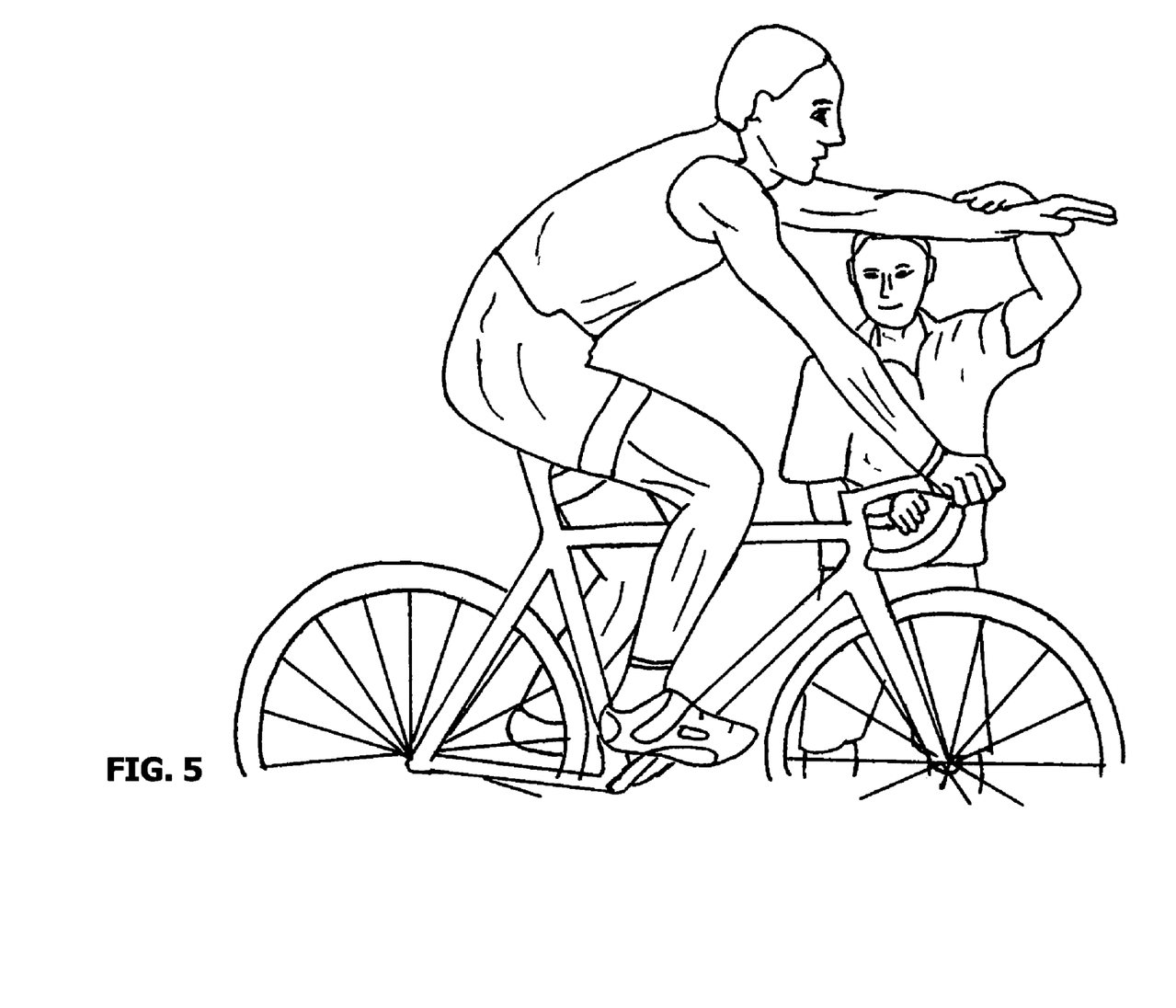
FIG. 5 is an illustration of a cyclist being challenged by a neuromuscular feedback test.

FIG. 5 illustrates a cyclist being tested on a stationary bicycle, which is immobilised using a frame. Rather than using the testing frame 400, the cyclist is instead positioned in the riding position on the bicycle for the neuromuscular test. Similarly, the cyclist will push down on the pedal 200". Testing on the bicycle while the cyclist is pedalling under load is performed to confirm functional compensation that tests strong on a testing frame 400.

A neuromuscular feedback test is used to determine the integrity and stability of various muscles and joint structures of the cyclist. Simply, a stimulus is applied to the cyclist's foot, namely by having the cyclist push down on a pedal 200", and then a physical challenge is presented to the cyclist. If the physical challenge is coped with well, then the tester can conclude that the neuromuscular feedback from the foot that is being stimulated is getting through to the brain clearly. If the physical challenge is coped with poorly, the tester can conclude that the brain is unable to gain clear proprioceptive feedback from the stimulus. This failure can be attributed to many reasons, including posture, muscular tension and joint alignment and function. Absent other reasons for failing a neuromuscular feedback test, the primary reason for an unsuccessful neuromuscular feedback test is a compromised kinetic chain that can be improved by compensatory tilt of the cyclist's forefoot.

The cyclist places their foot in the cycling shoe 200 on the pedal 200" and applies force to the pedal 200". This provides the stimulus described above. If the relative alignment of the elements in the kinetic chain involved in pedalling is sufficient for achieving integrity and stability of the kinetic chain, then the proprioceptive signals generated as a result of the stimulus are recognized by the central nervous system clearly. When this happens, the cyclist can resist the physical challenge with ease, and this favourable result can be used to infer the relative clarity of proprioceptive feedback.

The physical challenge can take many forms but the one that is preferred for ease and convenience is to have the cyclist extend one arm horizontally from the shoulder while the tester applies a force to move the cyclist's extended arm downwardly. If the cyclist's arm can be moved using reasonable force, then the proprioceptive feedback from within the kinetic chain involved in the pedalling action is suboptimal, and the reason for this is that the cyclist's foot when pressing the pedal has excessive inversion or eversion thus compromising the kinetic chain.

As mentioned, the shoulder complex is commonly used to test the optimal cleat position. Each indicator muscle is desirably first tested for integrity. Firstly, the shoulder complex has to be able to resist reasonable force in both standing and sitting positions and must become weak with a ligament stretch reflex (stretching the muscle fibres of the antagonist).

In a normal, functioning joint complex (that is, the complex of bones, muscles, ligaments and other connective tissue), a joint is in optimal alignment when the muscles designed to stabilize the joint are working efficiently and effectively to hold the bones so as not to luxate, but not so firm as to limit the normal range of motion. The muscles that move the joint ideally do so with maximum force and minimal energy expenditure. These joint-moving muscles also communicate with agonists and antagonists in the kinematic chain to assist the stability and proper movement of neighbouring joints or even joints far along the kinetic chain.

Resisted static elevation of the shoulder (namely deltoids, biceps, and supraspinatus) by a reasonable force shows weakness immediately or after a short period (for example, 3 seconds), when a suboptimal proprioceptive input into the kinematic chain is present. Proprioception is an introspective sensory system of movement of body tissues in relation to each other.

The neuromuscular feedback test is repeated with different amounts of compensation until a favourable response to the test is found. The cyclist will be able to resist the test when a favourable optimal cleat position is found. Often this is within a range. The range is varies substantially between different people and can vary markedly between left and right feet in a single person. The optimal position can vary over time as the cyclist's functional abilities fluctuate (posture, flexibility, core strength, functional stability). The muscles that are tested are selected for convenience because they are muscles that allow the rider to keep a close to natural riding position.

Wedges 300 are added or subtracted until the cyclist can resist the physical challenge with ease while applying force to the pedal 200". This is a sensitive test and the difference between resisting the physical challenge, whatever it may be, can be as little as 1 mm as described above.

As a matter of convenience, testing can be performed with the use of in-shoe wedges 300', and using the testing frame 400. Once the desired amount of compensation is found using the in-shoe wedges 300', a number of equivalent cleat wedges 300" can be used and confirmed with a neuromuscular feedback test, once the cleat wedges 300" are attached to the cycling shoes 200. Testing performed on a testing frame 400 can be confirmed on a stationary bicycle in a riding position.

To demonstrate the effectiveness of the neuromuscular test to a cyclist, one can first ask the cyclist to pedal in a hard gear and extend one arm. The cyclist is asked to resist a downward push on their arm on "go", after warning with "ready, set, go". If the cyclist is unable to resist the physical challenge (and almost all uncompensated riders are unable to), one starts testing each leg separately as described herein.

Most cyclists will be riding without any wedges, orthoses or arch support insoles in place, effectively starting with zero correction. If the cyclist has some existing corrective measure, such as those described above, a greater (or sometimes a lesser) amount of compensatory correction is typically required.

Once a cyclist is testing favourably when exerting force with each leg in turn, the amount of compensation can be confirmed by repeating the test while seated on a bicycle mounted on a stationary trainer, which supports the bicycle in a stationary position and provides a resistance to pedalling. Occasionally, a cyclist fails the test on a bicycle mounted in a stationary trainer, and the compensation has to be adjusted accordingly. Typically, a cyclist responds favourably to testing on the testing frame 400 yet is unable to replicate this favourable response on the saddle of a bicycle mounted in a stationary trainer due to being unable to sit symmetrically on the saddle.

When testing off the bicycle mounted in a stationary trainer, namely with a testing frame 400, the cyclist is typically sitting on a large flat-topped stool or similar seat which inherently squares the cyclist's hips and pelvis. On a bicycle, under load, some cyclists are unable to sit with a balanced pelvic orientation, for a range of reasons. If the cyclist is not sitting squarely on the saddle, then the effective planes of movement that the cyclist's legs are working through are different to those when tested off the bicycle. Usually, what is required in this case is the addition or removal of one or more wedges on one or both sides. The cyclist is tested and re-tested as required under reasonable pedalling load until the cyclist tests strong, that is, responds favourably to the neuromuscular feedback test.

Figure 6:
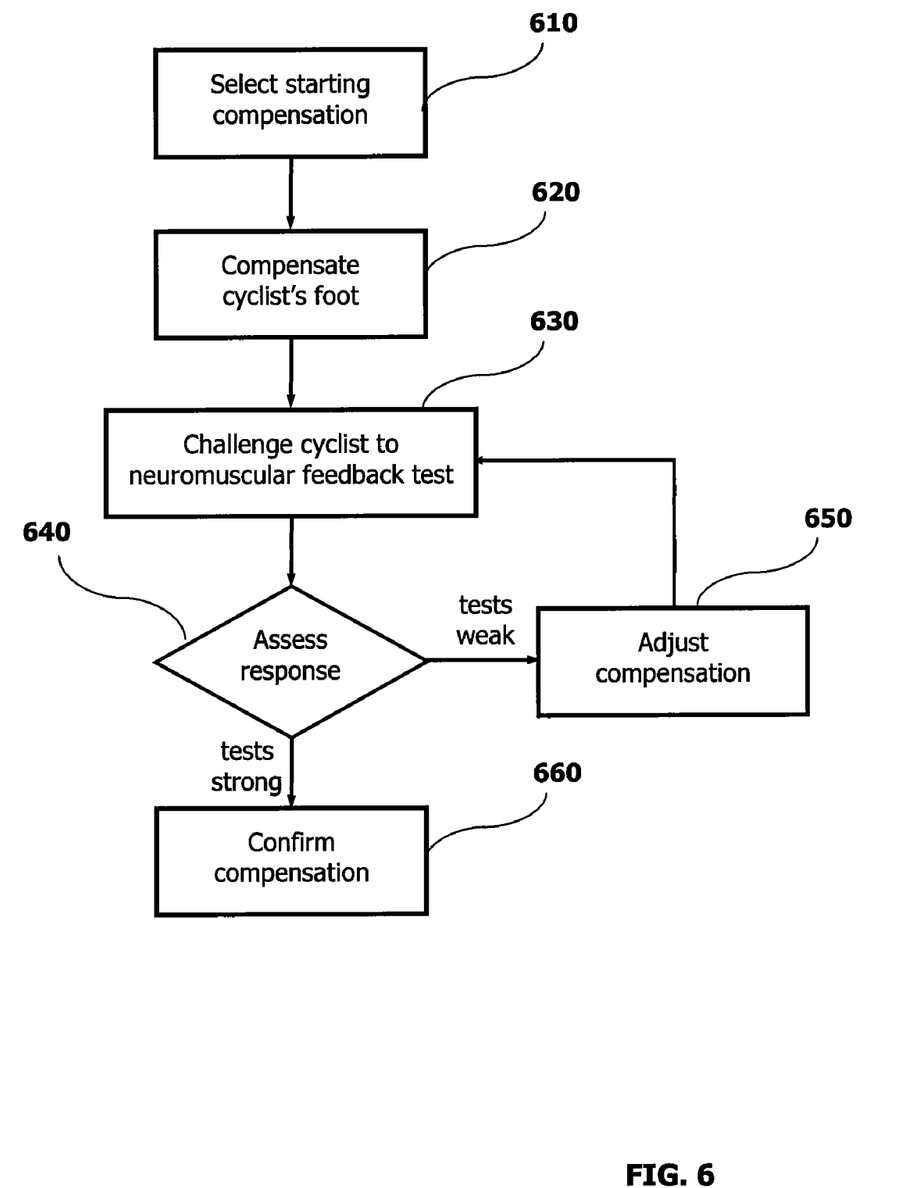
FIG. 6 is a flowchart of steps involved in functional fitting of cycling shoes in clipless pedals.

FIG. 6 is a flowchart that indicates by way of summary the steps that may be involved in providing a functional fit for a cyclist's shoe 200 in a clipless pedal 200". First, a starting amount of compensation required can be estimated in step 610. This estimate is used as a basis for providing a compensating inversion or eversion to the cycling shoe in step 620. Such estimates do not relate to how the cyclist may respond under dynamic testing, but can be used as a starting place. As an example, using the wedges 300 described above, a minimal forefoot tilt of 0° to 2° suggests a starting estimate of no wedges, a forefoot tilt of 3° to 7° suggests a starting estimate of 1 wedge, and forefoot tilt of 6° to 12° suggests 2 wedges as a starting estimate. A forefoot tilt of greater than 12° may suggest three wedges as a starting estimate. No particular starting estimate need be made, as one can start with no compensation, and test with successively greater levels of compensation.

The cyclist is then challenged with a neuromuscular feedback test in 630, as the cyclist pushes down on a clipless pedal 200". The cyclist's response to the neuromuscular feedback test is assessed in step 640. If the cyclist of found not to have responded favourably to the test, then the amount of compensation is adjusted, and the cyclist is again challenged to another neuromuscular feedback test in step 620. This process repeats though whatever number of iterations are required, until the cyclist the assessed to have responded favourably to the test in step 640. At this stage, the compensation with which the cyclist performs best is confirmed in step 650 by testing on a stationary bicycle, in the riding position.

In addition to providing compensation at the foot, it may also be necessary in extreme cases to provide accompanying forms of compensation, typically at the saddle by experimenting with lateral tilt and/or lateral shift to ensure that the cyclist's kinetic chain is functionally compensated.

Although the invention has been described with reference to specific examples, it will be appreciated by those skilled in the art that the invention may be embodied in many other forms. Particularly, while wedges—either in-shoe wedges or cleat wedges—are preferred to provide compensation to the cyclist, any other technique of varying the angle between the pedal axis and the cyclist's foot can also be advantageously used to provide suitable compensation. Instead of wedges, varying incremental amounts of compensation may be provided by a range of cleats, each of course being angled to provide different amounts of compensation. Similarly, a range of integrated shoe inserts can also be used. Alternatively, a variable amount of compensation can be provided via a suitably equipped clipless pedal system, such as described in U.S. Pat. No. 6,564,676 in the name of Look Cycle International. The content of this reference is hereby incorporated by reference. Despite the various modes of providing and adjusting the amount of compensation, wedging is preferred for the convenience of incremental testing using varying numbers of wedges.

The invention claimed is:

1. A method of fitting a cyclist in a cycling shoe engagable in a clipless pedal via a cleat affixed to the cycling shoe, the method comprising:

compensating for a cyclist's biomechanical malalignments within the kinetic chain involved in cycling by providing a tilt to the cyclist's forefoot; and challenging the cyclist with a neuromuscular feedback test as the cyclist uses their foot to apply a force through the cycling shoe to the clipless pedal;

whereby the compensation is varied and the cyclist is retested until a favourable response to the neuromuscular feedback test indicates a functional compensation.

2. The method of claim 1, wherein the biomechanical malalignment is compensated for using one or more wedges positioned inside the cycling shoe.

3. The method of claim 1, wherein the neuromuscular feedback test involves the cyclist attempting to withstand a downward force to their outstretched arm as the cyclist applies a forced through their foot.

4. The method of claim 1, wherein the cyclist is challenged to the neuromuscular feedback test with the assistance of a testing frame.

5. The method of claim 1, further comprising a step of confirming the functional compensation by retesting when the cyclist is positioned on a stationary bicycle in a riding position.

6. The method of claim 1, wherein the biomechanical malalignment is compensated for using multiple, identical wedges positioned inside a toebox of the cycling shoe, and each providing between about 0.5° and 2° of compensation.

7. The method of claim 1, wherein the biomechanical malalignment is compensated for using one or more wedges positioned between the cycling shoe and the cleat.

8. The method of claim 1, wherein the biomechanical malalignment is compensated for by selecting one or a range of cleats having a particular amount of compensation.

9. The method of claim 1, further comprising compensating for a cyclist's biomechanical malalignments within the kinetic chain involved in cycling by providing a lateral tilt to the cyclist's saddle.

10. The method of claim 1, further comprising compensating for a cyclist's biomechanical malalignments within the kinetic chain involved in cycling by providing a lateral offset to the cyclist's saddle.

\* \* \* \* \*